United States Patent
Fan et al.

(10) Patent No.: US 10,715,217 B2
(45) Date of Patent: Jul. 14, 2020

(54) DOWNLINK SIGNAL PRE-CORRECTION METHOD AND DEVICE

(71) Applicant: DATANG MOBILE COMMUNICATIONS EQUIPMENT CO., LTD, Beijing (CN)

(72) Inventors: Yujing Fan, Beijing (CN); Yuetan Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/484,112

(22) PCT Filed: Jan. 29, 2018

(86) PCT No.: PCT/CN2018/074494
§ 371 (c)(1),
(2) Date: Aug. 7, 2019

(87) PCT Pub. No.: WO2018/145587
PCT Pub. Date: Aug. 16, 2018

(65) Prior Publication Data
US 2020/0028542 A1    Jan. 23, 2020

(30) Foreign Application Priority Data
Feb. 7, 2017  (CN) .......................... 2017 1 0067711

(51) Int. Cl.
*H04B 7/01* (2006.01)
*H04L 5/00* (2006.01)
(Continued)

(52) U.S. Cl.
CPC ............. *H04B 7/01* (2013.01); *H04L 5/0051* (2013.01); *H04L 25/0226* (2013.01); *H04W 88/085* (2013.01)

(58) Field of Classification Search
None
See application file for complete search history.

(56) References Cited

U.S. PATENT DOCUMENTS

| 2004/0203468 A1* | 10/2004 | Dent ...................... H04B 7/022 455/67.14 |
| 2015/0189669 A1* | 7/2015 | Huang ................... H04B 7/024 370/329 |

(Continued)

FOREIGN PATENT DOCUMENTS

| CN | 102045094 A | 5/2011 |
| CN | 102164109 A | 8/2011 |

(Continued)

*Primary Examiner* — Faruk Hamza
*Assistant Examiner* — Cassandra L Decker
(74) *Attorney, Agent, or Firm* — Kilpatrick Townsend & Stockton, LLP

(57) ABSTRACT

A method and a device for pre-correction of a downlink signal are provided. The method comprises: on the basis of an obtained uplink frequency offset value of a first RRU and a second RRU corresponding to each client, determining a set of uplink frequency offset values corresponding to each RRU; when a downlink pre-correction period is reached, calculating an average uplink frequency offset value of the RRU; and on the basis of the average uplink frequency offset value of the RRU and a downlink pre-correction value in a previous pre-correction period, determining a downlink pre-correction value of the RRU in the current downlink pre-correction period.

8 Claims, 2 Drawing Sheets

(51) Int. Cl.
*H04L 25/02* (2006.01)
*H04W 88/08* (2009.01)
*H04L 1/00* (2006.01)

(56) References Cited

U.S. PATENT DOCUMENTS

2015/0200740 A1* 7/2015 Yi ........................ H04J 11/0053
　　　　　　　　　　　　　　　　　　　　　　　　　　11/53
2017/0374707 A1* 12/2017 Dai ....................... H04B 1/707

FOREIGN PATENT DOCUMENTS

| | | |
|---|---|---|
| CN | 102332942 A | 1/2012 |
| CN | 104301270 A | 1/2015 |
| CN | 105337693 A | 6/2016 |
| CN | 104683270 A | 10/2016 |
| CN | 106034093 A | 10/2016 |
| JP | 2007043500 A | 2/2007 |
| WO | 2016101386 A1 | 6/2016 |

* cited by examiner

DOWNLINK SIGNAL PRE-CORRECTION METHOD AND DEVICE

This application is a US National Stage of International Application No. PCT/CN2018/074494, filed Jan. 29, 2018, which claims priority to Chinese Patent Application No. 201710067711.4, filed with the Chinese Patent Office on Feb. 7, 2017, and entitled "Method and device for pre-correcting downlink signal", which is hereby incorporated by reference in its entirety.

FIELD

The present disclosure relates to the field of communications, and particularly to a method and device for pre-correcting downlink signal.

BACKGROUND

When there is relative movement between a transmitter and a receiver in a communication system, there is a shift of the frequency of a signal received by the receiver from the frequency of the signal transmitted by the transmitter, where the shift is referred to a Doppler shift, and calculated in the equation of $$\Delta f = \frac{f \cdot v}{c} \cos\theta,$$

where c is the velocity of light, v is a speed of relative movement between the receiver and the transmitter, and θ is an angle between a movement direction of the receiver and a propagation direction of the signal.

In a Long Term Evolution (LTE) system, in a scenario where a UE is moving at a high speed, there is a large absolute value of a Doppler shift due to a high LTE carrier frequency, and for example, in a scenario of a high-speed train including an LTE UE, the carrier frequency is 2.6 GHz, and the UE moves at 300 km/h, so there is such a significant Doppler shift of 720 Hz that the performance of the receiver is sharply degraded, the throughput of the network drops, and even the UE is hindered from accessing the network. In a scenario of high speed, a UE is moving at a high speed, in order to avoid the performance from being sharply degraded due to frequent switching, cells are typically merged, that is, a plurality of Radio Remote Units (RRUs) distributed along a highway or a railway are concatenated into a logic cell to thereby extend the coverage radius of the cell. In this case, when the UE moves from the coverage area of one RRU to the coverage area of another RRU, received signals of the two RRUs propagate in opposite direction, so there are opposite Doppler shifts, thus degrading the performance of the UE to receive a downlink signal. The amplitudes of the signals of the two RRUs received by the UE particularly at a place where the signals overlap are so approximate that the UE can neither make the frequency of a local oscillator agree with the frequencies of the received signals through Automatic Frequency Control (AFC), nor distinguish the signals of the two RRUs from each other, and pre-correct them respectively, thus seriously degrading the performance of receiving the downlink signal.

In the prior art, since an eNB may transmit a Dedicated Reference Signal to a UE in some special transmission mode, the eNB can instruct the UE via Radio Resource Control (RRC) interaction signaling (e.g., an RRC Reconfigure message) to transmit a signal in the specific transmission mode. In such a specific transmission mode, the eNB only pre-corrects a DRS and a Physical Downlink Shared Channel (PDSCH) to be transmitted to the UE, but will not pre-correct a Cell-specific Reference Signal (CRS), and the UE obtains a corresponding downlink signal frequency shift from the received DRS, and subsequently pre-corrects the pre-corrected downlink signal according to the obtained downlink signal frequency shift upon reception of the downlink signal.

However the existing solution to transmitting a DRS in a specific mode is a solution to pre-estimating and compensating for a downlink frequency shift in a high-speed scenario starting with the protocol layer, and in this solution, an eNB shall configure a UE with a special transmission mode via RRC signaling, thus resulting in a signaling burden, and downlink pre-correction and correction shall be performed by the network side and the UE side in cooperation, so both the eNB and the UE shall support this solution; and in the solution to transmitting a DRS in a specific mode, when there is sparse traffic of the UE, a DRS signal shall be transmitted periodically to the UE for downlink scheduling with the UE, thus resulting in unnecessary scheduling.

Accordingly it is desirable to provide a new method and device for pre-correcting a downlink signal so as to make up the drawback of the existing solution to pre-correcting a downlink signal.

SUMMARY

Embodiments of the disclosure provide a method and device for pre-correcting a downlink signal so as to address the problems in the prior art of complicated pre-correction of a downlink signal, and an additional signaling burden.

Specific technical solutions according to the embodiments of the disclosure are as follows.

An embodiment of the disclosure provides a method for pre-correcting a downlink signal, the method including:

obtaining uplink frequency shifts of a first Remote Radio Unit (RRU) and a second RRU corresponding to each client respectively, wherein the first RRU is an RRU of the client operating at a highest power, and the second RRU is an RRU of the client operating at a second highest power;

determining a set of uplink frequency shifts corresponding to each RRU respectively based upon the uplink frequency shifts of the first RRU and the second RRU corresponding to each client, wherein a set of uplink frequency shifts corresponding to an RRU includes uplink frequency shifts of the first RRUs or the second RRUs corresponding to all clients operating with the RRU; and upon determining that a downlink pre-correction periodicity arrives, performing respectively for each RRU the operations of:

calculating an average uplink frequency shift of the RRU based upon the uplink frequency shifts, of the first RRUs or the second RRUs corresponding to all clients operating with the RRU, in the set of frequency shifts of the RRU, and obtaining a downlink pre-correction value of the RRU in a last pre-correction periodicity; and determining a downlink pre-correction value of the RRU in a current downlink pre-correction periodicity based upon the average uplink frequency shift of the RRU and the downlink pre-correction value of the RRU in the last pre-correction periodicity.

Optionally obtaining the uplink frequency shifts of the first RRU and the second RRU corresponding to any one client includes:

determining the first RRU with a highest power of a Sounding Reference Signal (SRS), and the second RRU with a second highest power of the SRS, corresponding to the any one client respectively according to power of the received SRS of the any one client on each RRU; and calculating the uplink frequency shift of the first RRU and the uplink frequency shift of the second RRU corresponding to the any one client.

Optionally determining the set of frequency shifts corresponding to any one RRU based upon the uplink frequency shifts of the first RRU and the second RRU corresponding respectively to each client includes:

calculating an absolute value of a power difference between the first RRU and the second RRU corresponding to each client respectively; and performing respectively for each client the operations of:
when the any one RRU is determined as the first RRU corresponding to the client, allocating the uplink frequency shift of the first RRU corresponding to the client to the set of RRU frequency shifts corresponding to the any one RRU; and
when the any one RRU is determined as the second RRU corresponding to the client, and the absolute value of the power difference between the first RRU and the second RRU corresponding to the client is below a preset threshold, allocating the uplink frequency shift of the second RRU corresponding to the client to the set of RRU frequency shifts corresponding to the any one RRU.

Optionally determining the downlink pre-correction value of the RRU in the current downlink pre-correction periodicity based upon the average uplink frequency shift of the RRU and the downlink pre-correction value of the RRU in the last pre-correction periodicity includes:

comparing the average uplink frequency shift of the RRU with an inverse of the downlink pre-correction value of the RRU in the last pre-correction periodicity, and adjusting the downlink pre-correction value of the RRU in the current downlink pre-correction periodicity by stepping according to a comparison result.

Optionally adjusting the downlink pre-correction value of the RRU in the current downlink pre-correction periodicity by stepping according to the comparison result includes:

when the average uplink frequency shift of the RRU is more than the inverse of the downlink pre-correction value of the RRU in the last pre-correction periodicity, determining the downlink pre-correction value of the RRU in the current downlink pre-correction periodicity as the downlink pre-correction value of the RRU in the last pre-correction periodicity minus one preset frequency step;

when the average uplink frequency shift of the RRU is less than the inverse of the downlink pre-correction value of the RRU in the last pre-correction periodicity, determining the downlink pre-correction value of the RRU in the current downlink pre-correction periodicity as the downlink pre-correction value of the RRU in the last pre-correction periodicity plus one preset frequency step; and when the average uplink frequency shift of the RRU is equal to the inverse of the downlink pre-correction value of the RRU in the last pre-correction periodicity, determining the downlink pre-correction value of the RRU in the current downlink pre-correction periodicity as the downlink pre-correction value of the RRU in the last pre-correction periodicity.

An embodiment of the disclosure provides a device for pre-correcting a downlink signal, the device including:

an obtaining unit configured to obtain uplink frequency shifts of a first Remote Radio Unit (RRU) and a second RRU corresponding to each client respectively, wherein the first RRU is an RRU of the client operating at a highest power, and the second RRU is an RRU of the client operating at a second highest power;

a determining unit configured to determine a set of uplink frequency shifts corresponding to each RRU respectively based upon the uplink frequency shifts of the first RRU and the second RRU corresponding to each client, wherein a set of uplink frequency shifts corresponding to an RRU includes uplink frequency shifts of the first RRUs or the second RRUs corresponding to all clients operating with the RRU; and a performing unit configured, upon determining that a downlink pre-correction periodicity arrives, to perform respectively for each RRU the operations of:
calculating an average uplink frequency shift of the RRU based upon the uplink frequency shifts, of the first RRUs or the second RRUs corresponding to all clients operating with the RRU, in the set of frequency shifts of the RRU, and obtaining a downlink pre-correction value of the RRU in the last pre-correction periodicity; and
determining a downlink pre-correction value of the RRU in the current downlink pre-correction periodicity based upon the average uplink frequency shift of the RRU and the downlink pre-correction value of the RRU in the last pre-correction periodicity.

Optionally the obtaining unit configured to obtain the uplink frequency shifts of the first RRU and the second RRU corresponding to any one client is configured:

to determine the first RRU with a highest power of a Sounding Reference Signal (SRS), and the second RRU with a second highest power of the SRS, corresponding to the any one client respectively according to power of the received SRS of the any one client on each RRU; and to calculate the uplink frequency shift of the first RRU and the uplink frequency shift of the second RRU corresponding to the any one client.

Optionally the determining unit configured to determine the set of frequency shifts corresponding to any one RRU based upon the uplink frequency shifts of the first RRU and the second RRU corresponding respectively to each client is configured:

to calculate an absolute value of a power difference between the first RRU and the second RRU corresponding to each client respectively; and to perform respectively for each client the operations of:
when the any one RRU is determined as the first RRU corresponding to the client, to allocate the uplink frequency shift of the first RRU corresponding to the client to the set of RRU frequency shifts corresponding to the any one RRU; and
when the any one RRU is determined as the second RRU corresponding to the client, and the absolute value of the power difference between the first RRU and the second RRU corresponding to the client is below a preset threshold, to allocate the uplink frequency shift of the second RRU corresponding to the client to the set of RRU frequency shifts corresponding to the any one RRU.

Optionally the performing unit configured to determine the downlink pre-correction value of the RRU in the current downlink pre-correction periodicity based upon the average uplink frequency shift of the RRU, and the downlink pre-correction value of the RRU in the last pre-correction periodicity is configured:

to compare the average uplink frequency shift of the RRU with an inverse of the downlink pre-correction value of the RRU in the last pre-correction periodicity, and to adjust the downlink pre-correction value of the RRU in the current downlink pre-correction periodicity by stepping according to a comparison result.

Optionally the performing unit configured to adjust the downlink pre-correction value of the RRU in the current downlink pre-correction periodicity by stepping according to the comparison result is configured:

when the average uplink frequency shift of the RRU is more than the inverse of the downlink pre-correction value of the RRU in the last pre-correction periodicity, to determine the downlink pre-correction value of the RRU in the current downlink pre-correction periodicity as the downlink pre-correction value of the RRU in the last pre-correction periodicity minus one preset frequency step;

when the average uplink frequency shift of the RRU is less than the inverse of the downlink pre-correction value of the RRU in the last pre-correction periodicity, to determine the downlink pre-correction value of the RRU in the current downlink pre-correction periodicity as the downlink pre-correction value of the RRU in the last pre-correction periodicity plus one preset frequency step; and when the average uplink frequency shift of the RRU is equal to the inverse of the downlink pre-correction value of the RRU in the last pre-correction periodicity, to determine the downlink pre-correction value of the RRU in the current downlink pre-correction periodicity as the downlink pre-correction value of the RRU in the last pre-correction periodicity.

Advantageous effects of the embodiments of the disclosure are as follows.

In summary, in the embodiments of the disclosure, a base station pre-corrects a downlink signal by determining a set of uplink frequency shifts corresponding to each RRU respectively based upon obtained uplink frequency shifts of a first RRU and a second RRU corresponding to each client, and upon determining that a downlink pre-correction periodicity arrives, performing respectively for each RRU the operations of: calculating an average uplink shift of the RRU based upon the set of frequency shift of the RRU, obtaining a downlink pre-correction value of the RRU in the last pre-correction periodicity, and determining a downlink pre-correction value of the RRU in the current downlink pre-correction periodicity based upon the average uplink shift of the RRU and the downlink pre-correction value of the RRU in the last pre-correction periodicity. With this method, a downlink signal can be pre-corrected and corrected simply by the base station side, instead of the base station side and the user equipment side in cooperation; and furthermore the uplink frequency shifts of each user equipment are counted per RRU, without involving data interaction between the respective RRUs, to thereby lower the implementation complexity of the solution so as to improve a user experience.

DETAILED DESCRIPTION

Figure 1:
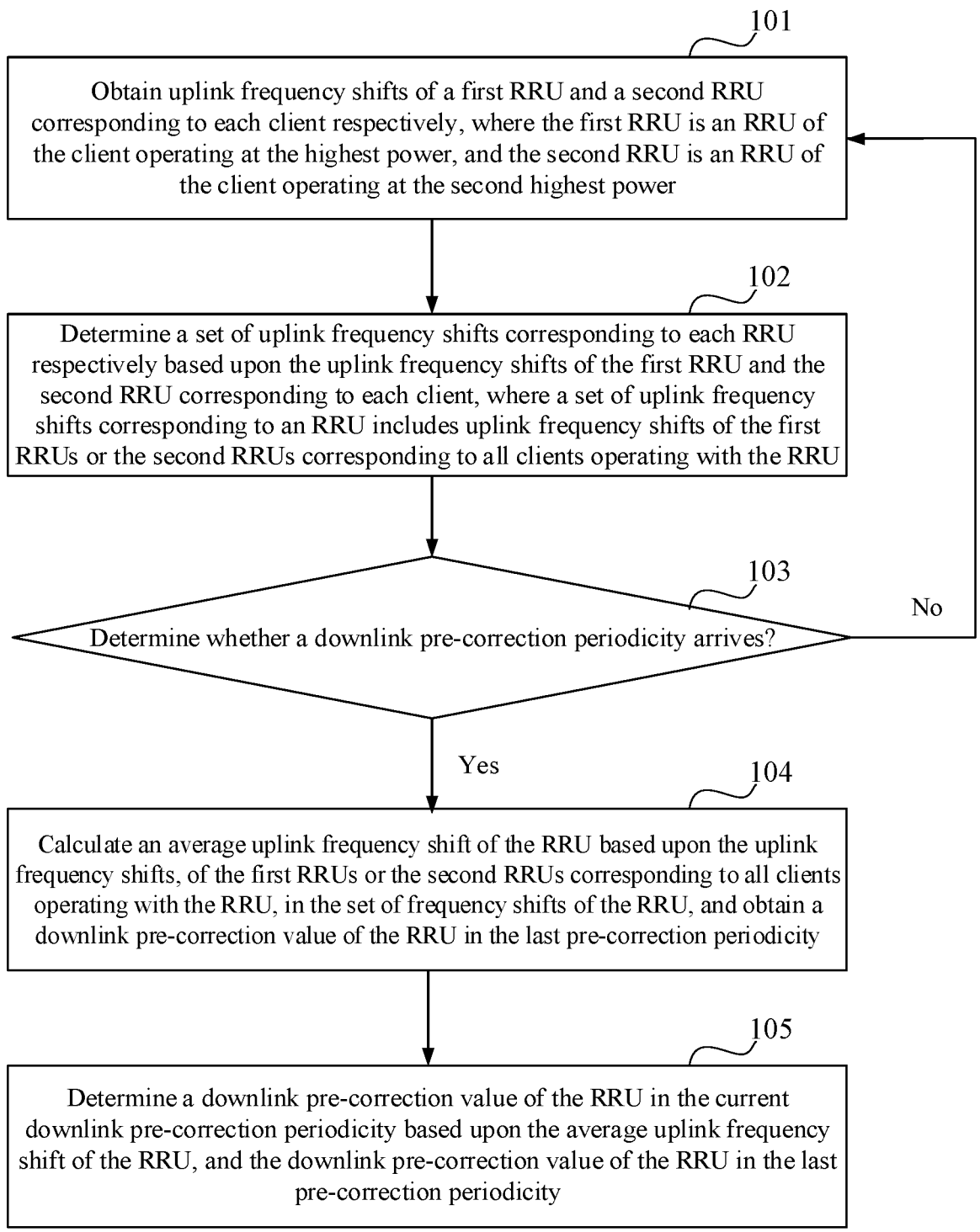
FIG. 1 is a detailed flow chart of a method for pre-correcting a downlink signal according to an embodiment of the disclosure.

In order to make the objects, technical solutions, and advantages of the embodiments of the disclosure more apparent, the technical solutions according to the embodiments of the disclosure will be described below clearly and fully with reference to the drawings in the embodiments of the disclosure, and apparently the embodiments to be described below are only a part but not all of the embodiments of the disclosure. Based upon the embodiments here of the disclosure, all the other embodiments which can occur to those ordinarily skilled in the art without any inventive effort shall fall into the scope of the disclosure.

It shall be appreciated that the technical solutions according to the embodiments of the disclosure can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a Long Term Evolution-Advanced (LTE-A) system, a Universal Mobile Telecommunication System (UMTS), etc.

It shall be further appreciated that in the embodiments of the disclosure, a User Equipment (UE) includes but will not be limited to a Mobile Station (MS), a mobile terminal, a mobile telephone, a handset, a portable equipment, etc., and the user equipment can communicate with one or more core networks over a Radio Access Network (RAN). For example, the user equipment can be a mobile phone (referred to as a "cellular" phone), a computer with a function of radio communication, etc., and the user equipment can also be a portable, pocket, handheld, built-in-computer, or on-vehicle mobile device.

In the embodiments of the disclosure, a base station (e.g., an access point) can be such a device in an access network that communicates with a radio terminal over one or more sectors via an air interface. The base station can be configured to convert a received air frame into an IP packet, and a received IP packet into an air frame, and operate as a router between the radio terminal, and the remaining components of the access network, where the remaining components of the access network can include an Internet Protocol (IP) network. The base station can further coordinate attribute management on the air interface, and for example, the base station can be a Base Transceiver Station (BTS) in a GSM or CDMA system, or can be a Node B in a WCDMA system, or can be an evolved base station (Node B or eNB or e-Node B, evolutional Node B) in an LTE system, although the disclosure will not be limited thereto.

In order to address the problems in the prior art of complicated pre-correction of a downlink signal, and an additional signaling burden, the embodiments of the disclosure provide a method and device for pre-correcting a downlink signal. The method includes: determining a set of uplink frequency shifts corresponding to each Radio Remote Unit (RRU) respectively based upon obtained uplink frequency shifts of a first RRU and a second RRU corresponding to each client, and upon determining that a downlink pre-correction periodicity arrives, performing respectively for each RRU the operations of: calculating an average uplink shift of the RRU based upon the set of frequency shift of the RRU, obtaining a downlink pre-correction value of the RRU in the last pre-correction periodicity, and determining a downlink pre-correction value of the RRU in the current downlink pre-correction periodicity based upon the average uplink shift of the RRU, and the downlink pre-correction value of the RRU in the last pre-correction periodicity.

The technical solutions according to the embodiments of the disclosure will be described below clearly and fully with reference to the drawings in the embodiments of the disclosure, and apparently the embodiments to be described below are only a part but not all of the embodiments of the disclosure. Based upon the embodiments here of the disclosure, all the other embodiments which can occur to those ordinarily skilled in the art without any inventive effort shall fall into the scope of the disclosure.

The inventive solutions will be described below in details in connection with specific embodiments thereof, and of course, the disclosure will not be limited to the following embodiments.

As illustrated in FIG. 1, a detailed flow of a method for pre-correcting a downlink signal according to an embodiment of the disclosure is as follows.

The step 101 is to obtain uplink frequency shifts of a first RRU and a second RRU corresponding to each client respectively, where the first RRU is an RRU of the client operating at the highest power, and the second RRU is an RRU of the client operating at the second highest power.

In a real application, the base station obtains the power of the respective RRUs used by each client upon reception of uplink signals transmitted by the client through the RRUs.

Specifically in the step 101, a base station determines the first RRU with the highest power of a Sounding Reference Signal (SRS), and the second RRU with the second highest power of the SRS corresponding to any one client respectively, according to the received SRS of the any one client on each RRU.

For example, the base station receives an SRS transmitted by a client 1 through an RRU 1, an RRU 2, an RRU 3, and an RRU 4, and when the base station determines the RRU 1 as an RRU with the highest power of the SRS for the client 1, then the base station determines the RRU 1 as the first RRU corresponding to the client 1; and when the base station determines the RRU 4 as an RRU with the second highest power of the SRS for the client 1, then the base station determines the RRU4 as the second RRU corresponding to the client 1.

Furthermore the base station calculates an uplink frequency shift of the first RRU, and an uplink frequency shift of the second RRU, corresponding to the any one client above.

For example, the RRU 1 is the first RRU corresponding to the client 1, and the RRU 4 is the second RRU corresponding to the client 2, so the base station calculates an uplink frequency shift of the RRU 1 as 300 Hz, and an uplink frequency shift of the RRU 4 as 200 Hz.

Of course, the base station can calculate the uplink frequency shifts of the first RRU and the second RRU corresponding to the any one client above as in the prior art, so a repeated description thereof will be omitted here. The base station can process an uplink signal transmitted by the client in an uplink correction alogorithm without any limitation thereto to obtain the uplink frequency shifts of the first RRU and the second RRU corresponding to the client.

The step 102 is to determine a set of uplink frequency shifts corresponding to each RRU respectively based upon the uplink frequency shifts of the first RRU and the second RRU corresponding to each client, where the set of uplink frequency shifts corresponding to an RRU includes uplink frequency shifts of the first RRUs or uplink frequency shifts of the second RRUs corresponding to all the clients operating with the RRU.

In a real application, the base station sets a corresponding set of RRU frequency shifts for each RRU, the base station determines a set of RRU frequency shifts corresponding to each RRU respectively according to the uplink frequency shifts of the first RRU and the second RRU corresponding to each client, and the absolute value of the power difference between the first RRU and the second RRU, and when the base station determines that the absolute value of the power difference between the first RRU and the second RRU corresponding to any one client is below a preset threshold, then the base station may allocate the first RRU and the second RRU into the corresponding sets of RRU frequency shifts; and when the base station determines the absolute value of the power difference between the first RRU and the second RRU corresponding to any one client is above or at the preset threshold, then the base station may only allocate the first RRU into the corresponding set of RRU frequency shifts.

For example, the power of the first RRU (e.g., the RRU 1) corresponding to the client 1 is 80 dB, the power of the second RRU (e.g., the RRU 4) corresponding to the client 1 is 70 dB, and the preset threshold is 15 dB, so the base station determines that the power difference between the RRU 1 and the RRU 4 is 10 dB (10 dB<15 dB), and thus allocates the uplink frequency shift of the RRU 1 corresponding to the client 1 into a set of frequency shifts corresponding to RRU1, and the uplink frequency shift of the RRU 4 corresponding to the client 1 into a set of frequency shifts corresponding to RRU4.

In another example, the power of the first RRU (e.g., the RRU 1) corresponding to the client 1 is 80 dB, the power of the second RRU (e.g., the RRU 4) corresponding to the client 1 is 50 dB, and the preset threshold is 15 dB, so the base station determines that the power difference between the RRU 1 and the RRU 4 is 30 dB (30 dB>15 dB), and thus the base station only allocates the uplink frequency shift of the RRU 1 corresponding to the client 1 into the set of frequency shifts corresponding to the RRU 1.

Specifically in the step 102, the base station calculates the absolute value of the power difference between the first RRU and the second RRU corresponding to each client respectively, and performs respectively for each client the following operations.

Upon determining any one RRU as the first RRU corresponding to one client, the base station puts the uplink frequency shift of the first RRU corresponding to the client into the set of RRU frequency shifts corresponding to the any one RRU.

For example, the RRU 1 is the first RRU corresponding to the client 1, and the RRU 3 is the first RRU corresponding to the client 2, so the base station allocates the uplink frequency shift of the RRU 1 corresponding to the client 1 to the set of RRU frequency shifts corresponding to the RRU 1, and the uplink frequency shift of the RRU 3 corresponding to the client 2 to the set of RRU frequency shifts corresponding to the RRU 3.

Upon determining any one RRU as the second RRU corresponding to one client, and the absolute value of the power difference between the first RRU and the second RRU corresponding to the client is below the preset threshold, the base station allocates the uplink frequency shift of the second RRU corresponding to the client into the set of RRU frequency shifts corresponding to the any one RRU above.

For example, the RRU 1 is the first RRU corresponding to the client 2, the RRU 2 is the second RRU corresponding to the client 1, and the preset threshold is 15 dB, so when the absolute value of the power difference between the RRU 1 and the RRU 2 is below 15 dB, then the base station allocates the uplink frequency shift of the RRU 2 corresponding to the client 2 to the set of RRU frequency shifts corresponding to the RRU 2.

The step 103 is to determine whether a downlink pre-correction periodicity arrives, and if so, to proceed to the step 104; otherwise, to proceed to the step 101.

Specifically the time length of the downlink pre-correction periodicity can be set according to a different application environment and/or a different real service demand. In one embodiment, the downlink pre-correction periodicity is set to 20 ms, that is, the base station adjusts the downlink pre-correction periodicity once at an interval of 20 ms.

The step 104 is to calculate an average uplink frequency shift of the RRU based upon the uplink frequency shifts of the first RRUs or the uplink frequency shifts of the second RRUs corresponding to all the clients operating with the RRU, in the set of frequency shifts of the RRU, and to obtain a downlink pre-correction value of the RRU in the last pre-correction periodicity.

In a real application, the base station calculates the average uplink shift of each RRU respectively according to the set of frequency shifts corresponding to each RRU upon determining that the downlink pre-correction periodicity arrives.

Specifically in the step 104, the base station calculates the average uplink frequency shift of the RRU according to the uplink frequency shifts, of the first RRUs or the second RRUs corresponding to the respective clients, in the set of RRU frequency shifts corresponding to the RRU.

For example, the set of frequency shifts of the RRU 1 includes an uplink frequency shift 1 of the RRU 1 corresponding to the client 1, an uplink frequency shift 2 of the RRU 1 corresponding to the client 2, and an uplink frequency shift 3 of the RRU 1 corresponding to the client 3, so the base station can calculate the average uplink frequency shift of the RRU 1 according to the uplink frequency shift 1, the uplink frequency shift 2, and the uplink frequency shift 3, e.g., as (the uplink frequency shift 1+ the uplink frequency shift 2+ the uplink frequency shift 3)/3.

Furthermore the base station obtains a downlink pre-correction value of the RRU in the last pre-correction periodicity, where an initial downlink pre-correction value is set to 0. Since there is not any last pre-correction periodicity for the first pre-correction periodicity, subsequent operations can be performed according to the average uplink frequency shift of the RRU, and the initial downlink pre-correction value.

The step 105 is to determine a downlink pre-correction value of the RRU in the current downlink pre-correction periodicity based upon the average uplink frequency shift of the RRU, and the downlink pre-correction value of the RRU in the last pre-correction periodicity.

In a real application, after determining the average uplink frequency shift of the RRU according to the set of frequency shifts corresponding to the RRU and obtaining the downlink pre-correction value of the RRU in the last pre-correction periodicity, the base station compares the average uplink frequency shift of the RRU with the inverse of the downlink pre-correction value of the RRU in the last pre-correction periodicity, and adjusts the downlink pre-correction value of the RRU in the current downlink pre-correction periodicity by stepping the according to a comparison result.

Specifically in the step 105, the base station adjusts the downlink pre-correction value of the RRU in the current downlink pre-correction periodicity by different stepping according to a different comparison result.

When the average uplink frequency shift of the RRU is more than the inverse of the downlink pre-correction value of the RRU in the last pre-correction periodicity, then the downlink pre-correction value of the RRU in the current downlink pre-correction periodicity is the downlink pre-correction value of the RRU in the last pre-correction periodicity minus a preset frequency step.

For example, the average uplink frequency shift of the RRU 1 is 400 Hz, the downlink correction value of the RRU 1 in the last pre-correction periodicity is −300 Hz, and the preset frequency step is 20 Hz, so the base station compares 400 Hz with the inverse of −300 Hz (300 Hz), and determines that 400 Hz is more than 300 Hz, and thus determines the downlink pre-correction value of the RRU 1 in the current downlink pre-correction periodicity as −300 Hz−20 Hz=−320 Hz.

In another example, the average uplink frequency shift of the RRU 2 is −300 Hz, the downlink correction value of the RRU 2 in the last pre-correction periodicity is 400 Hz, and the preset frequency step is 20 Hz, so the base station compares −300 Hz with the inverse of 400 Hz (−400 Hz), and determines that −300 Hz is more than −400 Hz, and thus determines the downlink pre-correction value of the RRU 2 in the current downlink pre-correction periodicity as 400 Hz−20 Hz=380 Hz.

When the average uplink frequency shift of the RRU is less than the inverse of the downlink pre-correction value of the RRU in the last pre-correction periodicity, then the downlink pre-correction value of the RRU in the current downlink pre-correction periodicity is the downlink pre-correction value of the RRU in the last pre-correction periodicity plus a preset frequency step.

For example, the average uplink frequency shift of the RRU 1 is 300 Hz, the downlink correction value of the RRU 1 in the last pre-correction periodicity is −400 Hz, and the preset frequency step is 20 Hz, so the base station compares 300 Hz with the inverse of −400 Hz (400 Hz), and determines that 300 Hz is less than 400 Hz, and thus determines the downlink pre-correction value of the RRU 1 in the current downlink pre-correction periodicity as −400 Hz+20 Hz=−380 Hz.

In another example, the average uplink frequency shift of the RRU 2 is −400 Hz, the downlink correction value of the RRU 2 in the last pre-correction periodicity is 300 Hz, and the preset frequency step is 20 Hz, so the base station compares −400 Hz with the inverse of 300 Hz (−300 Hz), and determines that −400 Hz is less than −300 Hz, and thus determines the downlink pre-correction value of the RRU 2 in the current downlink pre-correction periodicity as 300 Hz+20 Hz=320 Hz.

When the average uplink frequency shift of the RRU is equal to the inverse of the downlink pre-correction value of the RRU in the last pre-correction periodicity, then the downlink pre-correction value of the RRU in the current downlink pre-correction periodicity is the downlink pre-correction value of the RRU in the last pre-correction periodicity.

For example, the average uplink frequency shift of the RRU 1 is 300 Hz, the downlink correction value of the RRU 1 in the last pre-correction periodicity is −300 Hz, and the preset frequency step is 20 Hz, so the base station compares 300 Hz with the inverse of −300 Hz (300 Hz), and determines that 300 Hz is equal to 300 Hz, and thus determines the downlink pre-correction value of the RRU 1 in the current downlink pre-correction periodicity as −300 Hz.

For example, the average uplink frequency shift of the RRU 2 is −400 Hz, the downlink correction value of the RRU 2 in the last pre-correction periodicity is 400 Hz, and the preset frequency step is 20 Hz, so the base station compares −400 Hz with the inverse of 400 Hz (−400 Hz), and determines that −400 Hz is equal to −400 Hz, and thus determines the downlink pre-correction value of the RRU 2 in the current downlink pre-correction periodicity as 400 Hz.

The embodiment above will be described below in further details in a specific application scenario.

In an LTE system, in a scenario where the client is moving at a high speed, for example, a carrier frequency is 2.6 GHz, the moving speed of the client is 360 km/h, a downlink pre-correction periodicity is 20 ms, and a downlink frequency shift varies by approximately 16 Hz in the 20 ms periodicity, that is, a preset frequency step is set to 16 Hz. When the first 20 ms periodicity arrives, the base station calculates the average frequency shift of the RRU 1 as 200 Hz, and at this time, since no downlink pre-correction is performed in the first downlink pre-correction periodicity, a downlink pre-correction value in the first downlink pre-correction periodicity is 0 Hz, and thus the average uplink frequency shift (200 Hz) of the RRU 1 is more than the downlink pre-correction value (0 Hz) in the first downlink pre-correction periodicity, so a downlink pre-correction value (0 Hz) in the second downlink pre-correction periodicity is 0-16 Hz=−16 Hz; when the second 20 ms periodicity arrives, the base station calculates the average uplink frequency shift of the RRU 1 as 180 Hz, and at this time, a downlink frequency shift in the second downlink pre-correction periodicity is −16 Hz, and apparently 180 Hz is more than −(−16 Hz), so a downlink pre-correction value in the third downlink pre-correction periodicity is −16 Hz−16 Hz=−32 Hz; and so on. A downlink pre-correction value of an RRU in the current downlink pre-correction periodicity is adjusted in a stepping manner, and after it is adjusted for a number n of times, the resulting downlink pre-correction value of the RRU is substantially equal to the average uplink frequency shift of the RRU, that is, there is substantially no frequency shift of a downlink signal transmitted by the base station after the downlink signal arrives at the client, where n is a positive integer more than or equal to 1.

Figure 2:
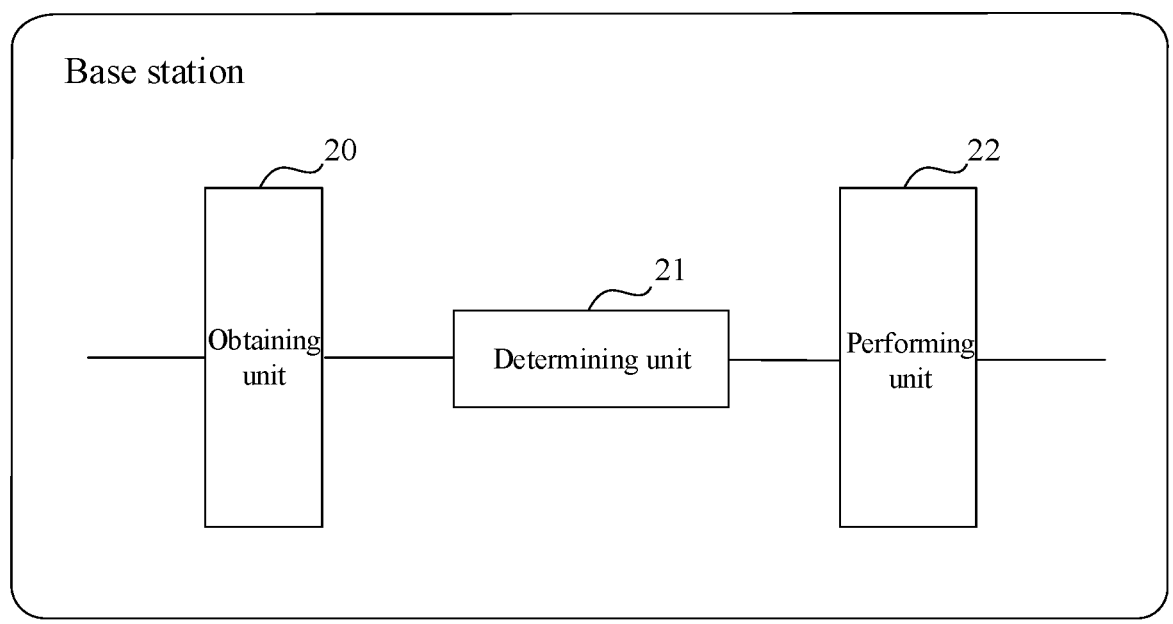
FIG. 2 is a schematic structural diagram of a device for pre-correcting a downlink signal according to an embodiment of the disclosure.

Further to the embodiment above, as illustrated in FIG. 2, a device for pre-correcting a downlink signal according to an embodiment of the disclosure (e.g., a base station) includes at least an obtaining unit 20, a determining unit 21, and a performing unit 22.

The obtaining unit 20 is configured to obtain uplink frequency shifts of a first Remote Radio Unit (RRU) and a second RRU corresponding to each client respectively, where the first RRU is an RRU of the client operating at the highest power, and the second RRU is an RRU of the client operating at the second highest power.

The determining unit 21 is configured to determine a set of uplink frequency shifts corresponding to each RRU respectively based upon the uplink frequency shifts of the first RRU and the second RRU corresponding to each client, where a set of uplink frequency shifts corresponding to an RRU includes uplink frequency shifts of the first RRUs or the second RRUs corresponding to all clients operating with the RRU.

The performing unit 22 is configured, upon determining that a downlink pre-correction periodicity arrives, to perform respectively for each RRU the operations of: calculating an average uplink frequency shift of the RRU based upon the uplink frequency shifts, of the first RRUs or the second RRUs corresponding to all the clients operating with the RRU, in the set of frequency shifts of the RRU, and obtaining a downlink pre-correction value of the RRU in the last pre-correction periodicity; and determining a downlink pre-correction value of the RRU in the current downlink pre-correction periodicity based upon the average uplink frequency shift of the RRU, and the downlink pre-correction value of the RRU in the last pre-correction periodicity.

Optionally the obtaining unit 20 configured to obtain the uplink frequency shifts of the first RRU and the second RRU corresponding to any one client is configured: to determine the first RRU with the highest power of a Sounding Reference Signal (SRS), and the second RRU with the second highest power of the SRS, corresponding to the any one client respectively according to power of the received SRS of the any one client on each RRU; and to calculate the uplink frequency shift of the first RRU, and the uplink frequency shift of the second RRU, corresponding to the any one client.

Optionally the determining unit 21 configured to determine the set of frequency shifts corresponding to any one RRU based upon the uplink frequency shifts of the first RRU and the second RRU corresponding respectively to each client is configured: to calculate the absolute value of the power difference between the first RRU and the second RRU corresponding to each client respectively; and to perform respectively for each client the operations of: when the any one RRU is determined as the first RRU corresponding to the client, to allocate the uplink frequency shift of the first RRU corresponding to the client to the set of RRU frequency shifts corresponding to the any one RRU; and when the any one RRU is determined as the second RRU corresponding to the client, and the absolute value of the power difference between the first RRU and the second RRU corresponding to the client is below a preset threshold, to allocate the uplink frequency shift of the second RRU corresponding to the client to the set of RRU frequency shifts corresponding to the any one RRU.

Optionally the performing unit 22 configured to determine the downlink pre-correction value of the RRU in the current downlink pre-correction periodicity based upon the average uplink frequency shift of the RRU, and the downlink pre-correction value of the RRU in the last pre-correction periodicity is configured: to compare the average uplink frequency shift of the RRU with the inverse of the downlink pre-correction value of the RRU in the last pre-correction periodicity, and to adjust the downlink pre-correction value of the RRU in the current downlink pre-correction periodicity by stepping according to a comparison result.

Optionally the performing unit 22 configured to adjust the downlink pre-correction value of the RRU in the current downlink pre-correction periodicity by stepping according to the comparison result is configured: when the average uplink frequency shift of the RRU is more than the inverse of the downlink pre-correction value of the RRU in the last pre-correction periodicity, to determine the downlink pre-correction value of the RRU in the current downlink pre-correction periodicity as the downlink pre-correction value of the RRU in the last pre-correction periodicity minus one preset frequency step; when the average uplink frequency shift of the RRU is less than the inverse of the downlink pre-correction value of the RRU in the last pre-correction periodicity, to determine the downlink pre-correction value of the RRU in the current downlink pre-correction periodicity as the downlink pre-correction value of the RRU in the last pre-correction periodicity plus one preset frequency step; and when the average uplink frequency shift of the RRU is equal to the inverse of the downlink pre-correction value of the RRU in the last pre-correction periodicity, to determine the downlink pre-correction value of the RRU in the current downlink pre-correction periodicity as the downlink pre-correction value of the RRU in the last pre-correction periodicity.

In summary, in the embodiments of the disclosure, a base station pre-corrects a downlink signal by determining a set of uplink frequency shifts corresponding to each RRU respectively based upon obtained uplink frequency shifts of a first RRU and a second RRU corresponding to each client, and upon determining that a downlink pre-correction periodicity arrives, performing respectively for each RRU the operations of: calculating an average uplink shift of the RRU based upon the set of frequency shift of the RRU, obtaining a downlink pre-correction value of the RRU in the last pre-correction periodicity, and determining a downlink pre-correction value of the RRU in the current downlink pre-correction periodicity based upon the average uplink shift of the RRU, and the downlink pre-correction value of the RRU in the last pre-correction periodicity. With this method, a downlink signal can be pre-corrected and corrected simply by the base station side instead of the base station side and the user equipment side in cooperation; and furthermore the uplink frequency shifts of each user equipment are counted per RRU, without involving data interaction between the respective RRUs, to thereby lower the implementation complexity of the solution so as to improve a user experience.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the disclosure have been described, those skilled in the art benefiting from the underlying inventive concept can make additional modifications and variations to these embodiments. Therefore the appended claims are intended to be construed as encompassing the embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for pre-correcting a downlink signal, wherein a plurality of clients are served by a base station, each of the plurality of clients communicates with the base station via a plurality of Remote Radio Units (RRUs), the method comprises:

obtaining uplink frequency shifts of a first RRU and a second RRU corresponding to each of the plurality of clients respectively, wherein for each of the plurality of clients, the first RRU is one of the RRUs corresponding to the respective client operating at a highest power, and the second RRU is one of the RRUs corresponding to the respective client operating at a second highest power;

determining a set of uplink frequency shifts corresponding to each of the RRUs based upon the uplink frequency shifts of the first RRU and the second RRU respectively corresponding to each client of the plurality of clients; and upon determining that a downlink pre-correction period arrives, performing respectively for each of the RRUs the operations of:

calculating an average uplink frequency shift of the RRU based upon the uplink frequency shifts in the set of uplink frequency shifts of the RRU, and obtaining a downlink pre-correction value of the RRU in a last pre-correction period; and determining a downlink pre-correction value of the RRU in a current downlink pre-correction period based upon the average uplink frequency shift of the RRU and the downlink pre-correction value of the RRU in the last pre-correction period;

wherein determining the set of uplink frequency shifts corresponding to each of the RRUs based upon the uplink frequency shifts of the first RRU and the second RRU respectively corresponding to each of the plurality of clients comprising:

calculating an absolute value of a power difference between the first RRU and the second RRU corresponding to a respective client; and for each of the plurality of clients, performing the operations of:

when one of the RRUs is determined as the first RRU corresponding to the respective client, allocating the uplink frequency shift of the first RRU corresponding to the respective client to the set of uplink frequency shifts corresponding to the one RRU; and when one of the RRUs is determined as the second RRU corresponding to the respective client, and the absolute value of the power difference between the first RRU and the second RRU corresponding to the respective client is below a preset threshold, allocating the uplink frequency shift of the second RRU corresponding to the respective client to the set of uplink frequency shifts corresponding to the one RRU.

2. The method according to claim 1, wherein obtaining the uplink frequency shifts of the first RRU and the second RRU corresponding to each of the plurality of clients comprises:
determining the first RRU corresponding to a respective client as one of the RRUs with a highest power of a Sounding Reference Signal (SRS), and determining the second RRU corresponding to the respective client as one of the RRUs with a second highest power of the SRS according to power of the received SRS of the respective client on the RRUs; and
calculating the uplink frequency shifts of the first RRU and the second RRU corresponding to the respective client.

3. The method according to claim 1, wherein determining the downlink pre-correction value of the RRU in the current downlink pre-correction period based upon the average uplink frequency shift of the RRU and the downlink pre-correction value of the RRU in the last pre-correction period comprises:
comparing the average uplink frequency shift of the RRU with an inverse of the downlinl pre-correction value of the RRU in the last pre-correction period, and adjusting the downlink pre-correction value of the RRU in the current downlink pre-correction period by stepping according to a comparison result.

4. The method according to claim 3, wherein adjusting the downlink pre-correction value of the RRU in the current downlink pre-correction period by stepping according to the comparison result comprises:
when the average uplink frequency shift of the RRU is more than the inverse of the downlink pre-correction value of the RRU in the last pre-correction period, determining the downlink pre-correction value of the RRU in the current downlink pre-correction period as the downlink pre-correction value of the RRU in the last pre-correction period minus one preset frequency step;
when the average uplink frequency shift of the RRU is less than the inverse of the downlink pre-correction value of the RRU in the last pre-correction period, determining the downlink pre-correction value of the RRU in the current downlink pre-correction period as the downlink pre-correction value of the RRU in the last pre-correction period plus one preset frequency step; and
when the average uplink frequency shift of the RRU is equal to the inverse of the downlink pre-correction value of the RRU in the last pre-correction period, determining the downlink pre-correction value of the RRU in the current downlink pre-correction period as the downlink pre-correction value of the RRU in the last pre-correction period.

5. A device for pre-correcting a downlink signal, applied to a base station, wherein a plurality of clients are served by the base station, each of the plurality of clients communicates with the base station via a plurality of Remote Radio Units (RRUs), wherein the device comprises a processor configured to:

obtain uplink frequency shifts of a first RRU and a second RRU corresponding to each of the plurality of clients respectively, wherein for each of the plurality of clients, the first RRU is one of the RRUs corresponding to the client operating at a highest power, and the second RRU is one of the RRUs corresponding to the client operating at a second highest power;
determine a set of uplink frequency shifts corresponding to each of the RRUs based upon the uplink frequency shifts of the first RRU and the second RRU respectively corresponding to each of the plurality of clients; and
upon determining that a downlink pre-correction period arrives, perform respectively for each of the RRUs the operations of:
calculating an average uplink frequency shift of the RRU based upon the uplink frequency shifts, in the set of uplink frequency shifts of the RRU, and obtaining a downlink pre-correction value of the RRU in a last pre-correction period; and
determining a downlink pre-correction value of the RRU in a current downlink pre-correction period based upon the average uplink frequency shift of the RRU and the downlink pre-correction value of the RRU in the last pre-correction period;
wherein determining the set of uplink frequency shifts corresponding to each of the RRUs based upon the uplink frequency shifts of the first RRU and the second RRU respectively corresponding to each of the plurality of clients comprising:
calculating an absolute value of a power difference between the first RRU and the second RRU corresponding to a respective client;
and for each of the plurality of clients, performing the operations of:
when one of the RRUs is determined as the first RRU corresponding to the respective client, allocating the uplink frequency shift of the first RRU corresponding to the respective client to the set of uplink frequency shifts corresponding to the one RRU; and
when one of the RRUs is determined as the second RRU corresponding to the respective client, and the absolute value of the power difference between the first RRU and the second RRU corresponding to the respective client is below a preset threshold, allocating the uplink frequency shift of the second RRU corresponding to the respective client to the set of uplink frequency shifts corresponding to the one RRU.

6. The device according to claim 5, wherein the processor configured to obtain the uplink frequency shifts of the first RRU and the second RRU corresponding to each of the plurality of clients is configured:
to determine the first RRU corresponding to a respective client as one of the RRUs with a highest power of a Sounding Reference Signal (SRS), and determine the second RRU corresponding to the respective client as one of the RRUs with a second highest power of the SRS according to power of the received SRS of the respective client on the RRUs; and
to calculate the uplink frequency shifts of the first RRU and the second RRU corresponding to the respective client.

7. The device according to claim 5, wherein the processor configured to determine the downlink pre-correction value of the RRU in the current downlink pre-correction period based upon the average uplink frequency shift of the RRU and the downlink pre-correction value of the RRU in the last pre-correction period is configured:

to compare the average uplink frequency shift of the RRU with an inverse of the downlink pre-correction value of the RRU in the last pre-correction period, and to adjust the downlink pre-correction value of the RRU in the current downlink pre-correction period by stepping according to a comparison result.

8. The device according to claim 7, wherein the processor configured to adjust the downlink pre-correction value of the RRU in the current downlink pre-correction period by stepping according to the comparison result is configured:

when the average uplink frequency shift of the RRU is more than the inverse of the downlink pre-correction value of the RRU in the last pre-correction period, to determine the downlink pre-correction value of the RRU in the current downlink pre-correction period as the downlink pre-correction value of the RRU in the last pre-correction period minus one preset frequency step;

when the average uplink frequency shift of the RRU is less than the inverse of the downlink pre-correction value of the RRU in the last pre-correction period, to determine the downlink pre-correction value of the RRU in the current downlink pre-correction period as the downlink pre-correction value of the RRU in the last pre-correction period plus one preset frequency step; and when the average uplink frequency shift of the RRU is equal to the inverse of the downlink pre-correction value of the RRU in the last pre-correction period, to determine the downlink pre-correction value of the RRU in the current downlink pre-correction period as the downlink pre-correction value of the RRU in the last pre-correction period.

* * * * *